E. KOSCINSKI.
INSTRUMENT FOR OBSERVING ANGLES.
APPLICATION FILED JULY 25, 1910.
989,852.
Patented Apr. 18, 1911.
2 SHEETS—SHEET 1.
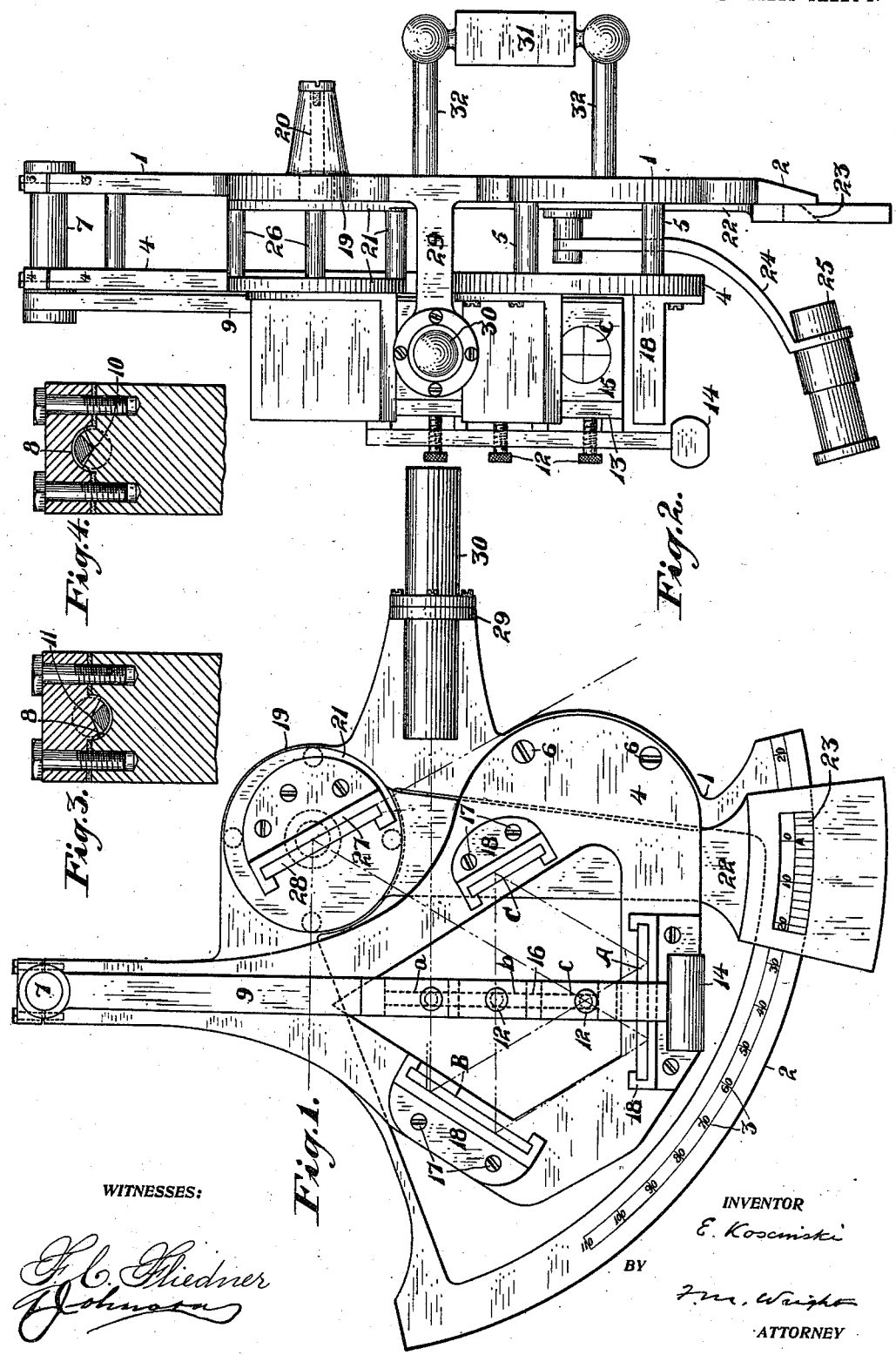

E. KOSCINSKI.
INSTRUMENT FOR OBSERVING ANGLES.
APPLICATION FILED JULY 25, 1910.
989,852.
Patented Apr. 18, 1911.
2 SHEETS—SHEET 2.
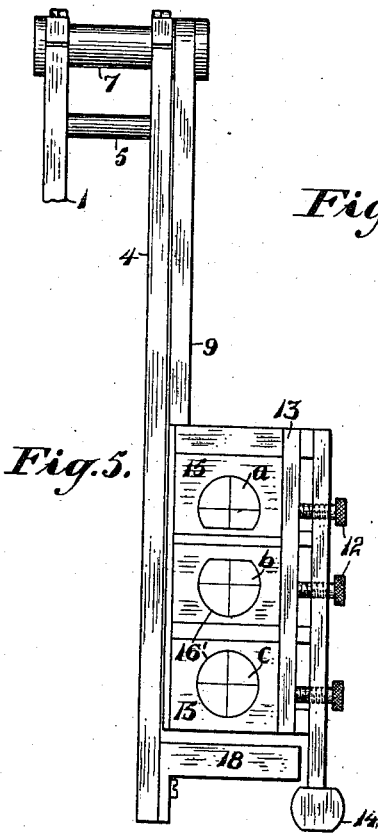
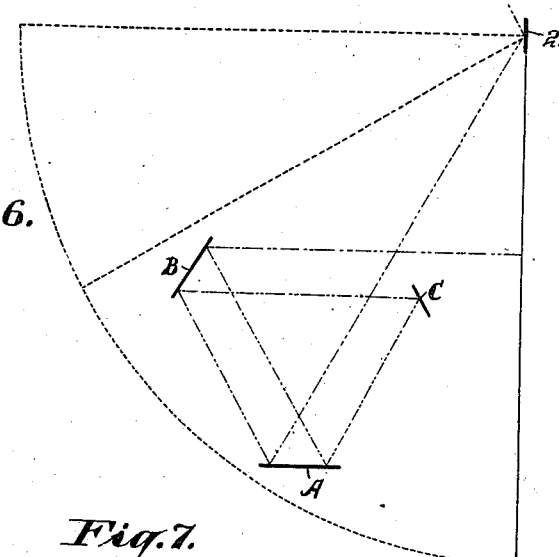
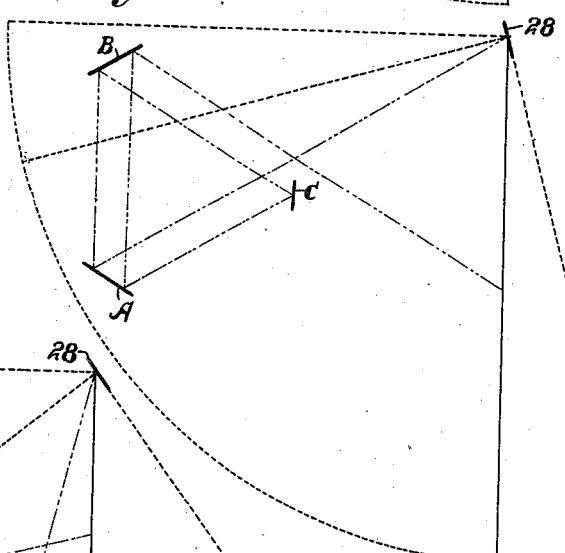
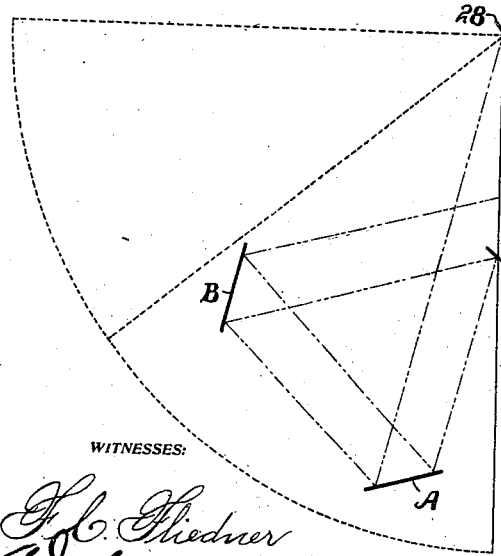
WITNESSES:
INVENTOR
E. Koscinski
BY
Fm. Wright,
ATTORNEY

UNITED STATES PATENT OFFICE.

ERNEST KOSCINSKI, OF OAKLAND, CALIFORNIA.

INSTRUMENT FOR OBSERVING ANGLES.

989,852.  Specification of Letters Patent.   Patented Apr. 18, 1911.

Application filed July 25, 1910.  Serial No. 573,738.

*To all whom it may concern:*

Be it known that I, ERNEST KOSCINSKI, a citizen of the United States, residing at Oakland, in the county of Alameda and State of California, have invented new and useful Improvements in Instruments for Observing Angles, of which the following is a specification.

The present invention relates to a reflecting instrument for measuring angles, and the object of the invention is to provide such an instrument which shall furnish an accurate artificial horizon within itself.

The instrument is primarily intended for taking high-altitude observations of the sun or other celestial objects in foggy weather, and also for taking such observations on shore, where a natural horizon cannot be obtained.

In the accompanying drawings, Figure 1 is a side elevation of the essential parts of my improved instrument; Fig. 2 is an end view; Figs. 3 and 4 are detail transverse sections on the lines 3—3, and 4—4 respectively of Fig. 2; Fig. 5 is a broken front view of the device showing more particularly the sights; Fig. 6 is a diagram showing the mode of use of the device; Figs. 7 and 8 are similar diagrams showing modified forms of the device, the position of the mirrors being changed.

In the device as illustrated herewith various parts are omitted which would be used in practice, but are not essential to the theoretically correct operation of the device. I desire it to be understood moreover that I do not confine myself to the exact form and construction of the parts as shown, since these may be modified in detail without departing from the spirit and intent of my invention.

Referring to the drawing, 1 indicates an inner plate carrying an arc limb 2, which is graduated in the usual manner, as shown at 3, and 4 indicates an outer plate rigidly secured in a plane parallel with the inner plate, but spaced therefrom by sleeves 5 and secured by screws 6 within said sleeves.

7 indicates a shaft which passes through holes 8 in the two plates 1, 4, and supporting upon its outer end extending beyond the plate 4 a hanger 9, said shaft having a knife edge 10 on its lower side in the bearing 8 in the plate 4 next to the hanger, and a knife edge 11 on its upper side in the bearing in the plate 1 remote from said hanger, whereby the hanger and the parts suspended thereby can swing freely and without friction in said bearings. Said hanger is for the purpose of suspending the three sights for establishing the horizon, said sights $a$, $b$, $c$, being secured by screws 12 in a frame piece 13. The lower end of said frame piece carries a receptacle 14 adapted to contain mercury. The mercury, being fluid, serves to dampen the oscillations of the hanger and to bring the sights quickly to the position of rest. Said sights are contained in slide-pieces 15 which can slide in vertical grooves 16 in the side pieces of the frame, and can be moved vertically either by hand or by screws, and are secured in their adjusted positions by means of the screws 12. The slide pieces are formed with apertures 16' and are provided with cross hairs extending across said apertures and forming the sights $a$, $b$, $c$.

Secured to the frame 4 by screws 17 are three frames 18, for supporting the mirrors $A$, $B$, $C$, arranged in planes making an angle of 60° with each other. On an extension 19 from the frame 1 is pivoted, as shown at 20, an index mirror frame 21, having a hanger 22 carrying at its lower end a vernier 23 which is adapted to oscillate with the index mirror and thereby move over the graduated limb 2, and which also carries a support 24 for a microscope 25 by which said vernier reading can be taken. Supported by posts 26 from the index mirror frame 21 is an index mirror plate 27 carrying the index mirror 28. Supported on an extension 29 from said frame 1 is a telescope 30. The instrument is held by a handle 31 secured to the frame 1 by posts 32.

The following is the mode of use of the device. Referring to Fig. 6, and supposing that it is required to take an observation of an object at an angle of 30° from the zenith, said object will be seen by the reflection at the index mirror 28, two reflections at each of the mirrors A, B, and one reflection at the mirror C, and the rays therefrom proceeding to the eye will eventually be in the horizontal direction. The mirror C is smaller than the mirrors A, B, and is arranged just below the axis of the telescope, so that the rays of light proceeding from the mirror B, after the second reflection thereat, pass over the mirror C and are directed to the telescope. When an observation is taken of the horizon, and the graduation should therefore read zero, the index mirror is in a plane making an angle of 30° with the vertical. The angle through which the index mirror moves is one-half of that of the altitude of the object, as in the ordinary sextant.

Figs. 7 and 8 are diagrams showing other arrangements of the mirrors A, B and C, Fig. 7 showing the arrangement of said mirrors in which the telescope must be directed upward and Fig. 8 in which it must be directed downward. The principle of operation is the same as in the main form of the invention. While in the main form of the invention the limit of observation above the horizon is 110° and below the horizon about 20, instruments constructed in accordance with said Diagrams 7 and 8 have the advantage of a greater amplitude of observation.

The adjustable slide sights $a$, $b$, $c$, are secured at right angles to the depending frame piece 13 in a plane perpendicular to a plane of the instrument, and vertically over the center of the mirror A. The sight $a$ is directly visible by the telescope 30. The sight $b$ is visible by one reflection from each of the mirrors C, A, B. The sight $c$ is visible both by one reflection from the mirror B, and by two reflections from the mirror A, two reflections from the mirror B and one reflection from the mirror C. These four images, of the sight $a$ seen once direct, of the sight $b$ seen once reflected, and of the sight $c$ seen twice reflected, must all coincide, whereupon an artificial horizon has been established. If the two images of sight C can not be made to coincide, the image requires adjustment, and must be adjusted until they do coincide, and further adjustments if necessary must then be made until the other images coincide.

By being enabled in this instrument to obtain a horizon independent of the natural horizon, the instrument is particularly adapted for observations where, with the ordinary instrument, the natural horizon could not be obtained on account of the high altitude of the place where the observation is taken, also for zenith observations or observations in foggy weather, in which case the fog generally lies low, so that celestial objects near the zenith can be observed, while those near the horizon are obscured.

With the ordinary transit, sextant, or other instrument for measuring altitudes, it is impossible to avoid the instrumental parallax, that is, the deviation from the correct angular observation, caused by placing the eye at a point not in the exact axial line of the telescope. With my improved instrument this cause of error is avoided, provided the instrument is properly adjusted, because, if the observer's eye is not placed exactly at the axial line of the telescope he is immediately apprised of that fact by the several sights not coinciding with each other. He therefore brings them into coincidence by moving his eye into a proper position. If he cannot bring them into coincidence, the reason is that the instrument requires further adjustment.

I claim:—

1. In an instrument for measuring angular elevations, the combination, with a frame and an outer rim, of three mirrors, the planes of which make acute angles with each other, and an index mirror arranged to reflect an image of an object at the horizon on to the first of said three mirrors, said three mirrors being so arranged that the object is seen by double reflection at two of said three mirrors and by a single reflection only at the third mirror, substantially as described.

2. In an instrument for measuring angular elevations, the combination with a frame and an arc limb, of a series of mirrors arranged in planes making an angle of 60° with each other, and an index mirror arranged to reflect an image of an object at the horizon on to one of said mirrors, substantially as described.

3. In an instrument for measuring angular elevations, the combination with a frame and an arc limb, of a series of mirrors arranged in planes making an angle of 60° with each other, and an index mirror arranged to reflect an image of an object at the horizon on to one of said mirrors, and a vertical series of sights and means for maintaining them in a vertical series, notwithstanding changes of position of the instrument, said sights being arranged so that the images thereof seen by reflection at said mirrors can be made to coincide, substantially as described.

4. In an instrument of the class described, the combination with the main frame of the sight frame swinging therefrom, the two bearings for said sight frame having knife edges which are of opposite directions, substantially as described.

In testimony whereof I have hereunto set my hand in the presence of two subscribing witnesses.

ERNEST KOSCINSKI.

Witnesses:
 FRANCIS M. WRIGHT,
 D. B. RICHARDS.